United States Patent
Pinhanez

(10) Patent No.: US 8,614,631 B2
(45) Date of Patent: Dec. 24, 2013

(54) FLOOD DATA COLLECTION AND WARNING MECHANISM

(75) Inventor: Claudio Santos Pinhanez, Sao Paulo (BR)

(73) Assignee: International Business Machines Corporation, Armonk, NY (US)

(*) Notice: Subject to any disclaimer, the term of this patent is extended or adjusted under 35 U.S.C. 154(b) by 323 days.

(21) Appl. No.: 13/088,494

(22) Filed: Apr. 18, 2011

(65) Prior Publication Data

US 2012/0264393 A1    Oct. 18, 2012

(51) Int. Cl.
*G08B 21/00* (2006.01)

(52) U.S. Cl.
USPC ........... 340/602; 340/601; 116/69; 455/404.1

(58) Field of Classification Search
USPC ............ 340/601, 602; 455/404.1, 466; 73/170.16, 170.17, 170.21; 116/69
See application file for complete search history.

(56) References Cited

U.S. PATENT DOCUMENTS

| | | | |
|---|---|---|---|
| 4,153,881 A * | 5/1979 | Permut et al. | 375/242 |
| 7,873,344 B2 | 1/2011 | Bowser et al. | |
| 2007/0298758 A1* | 12/2007 | Verma et al. | 455/404.1 |
| 2009/0102644 A1* | 4/2009 | Hayden | 340/540 |

OTHER PUBLICATIONS http://www.thefreelibrary.com/Signup+to+get+flood+warnings%3B+Residents+urged%3A+use+new+alert...-a0112846426.
http://maps.cassowarycoast.qld.gov.au/plan.
http://earthsci.org/flooding/unit4/u4-10-01.html.

* cited by examiner

*Primary Examiner* — Brian Zimmerman
*Assistant Examiner* — Laura Nguyen
(74) *Attorney, Agent, or Firm* — Ryan, Mason & Lewis, LLP

(57) ABSTRACT

Techniques for automatically providing flood warnings to individuals are provided. The techniques include receiving a message regarding a water level observed in connection with a totem display at a geographic area, using the message and one or more items of available data to generate a flood level prediction for the geographic area, and sending a flood warning to one or more registered individuals if the flood level prediction for the geographic area exceeds a predetermined threshold.

24 Claims, 4 Drawing Sheets

FLOOD DATA COLLECTION AND WARNING MECHANISM

FIELD OF THE INVENTION

Embodiments of the invention generally relate to information technology, and, more particularly, to data collection.

BACKGROUND OF THE INVENTION

Flood warning systems face multiple challenges. For example, challenges exist in the collection of data of water levels in specific areas, especially critical areas. Also, challenges exist in the determination of the people who should receive flood warnings.

Collection of water level data on rivers, areas, and streets for flood forecasting and monitoring can be performed by a variety of existing techniques, from satellite technology to manual methods. However, the cost, particularly the maintenance cost of sensors, often restricts their deployment in large areas. This can be especially true for developing countries.

In general, once water level data is collected, it can be used, together with flow information, meteorological and topological data, and similar data, to forecast flooding levels in specific areas. This information can then be used to warn people likely to be affected by the flooding, through mechanisms such as radio and television broadcasting, special disaster warning radio systems, and phone-based systems.

However, subscribing to such phone-based systems require often large advertising campaigns or similar communication efforts, which often have a limited time span and often do not follow the changes in the local residents. This is particularly important in many neighborhoods of large cities, where moving patterns are accelerated.

Accordingly, existing approaches possess a limited ability to sense flood levels in different parts of the city, and can often have difficulty in communicating with citizens in a specific area of the city affected by flooding, as well as facilitating communication between citizens and a call center with respect to description of localization and nature of flooding.

SUMMARY OF THE INVENTION

Principles and embodiments of the invention provide techniques for flood data collection and providing a warning mechanism. An exemplary method (which may be computer-implemented) for automatically providing flood warnings to individuals, according to one aspect of the invention, can include steps of receiving a message regarding a water level observed in connection with a totem display at a geographic area, using the message and one or more items of available data to generate a flood level prediction for the geographic area, and sending a flood warning to one or more registered individuals if the flood level prediction for the geographic area exceeds a predetermined threshold.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
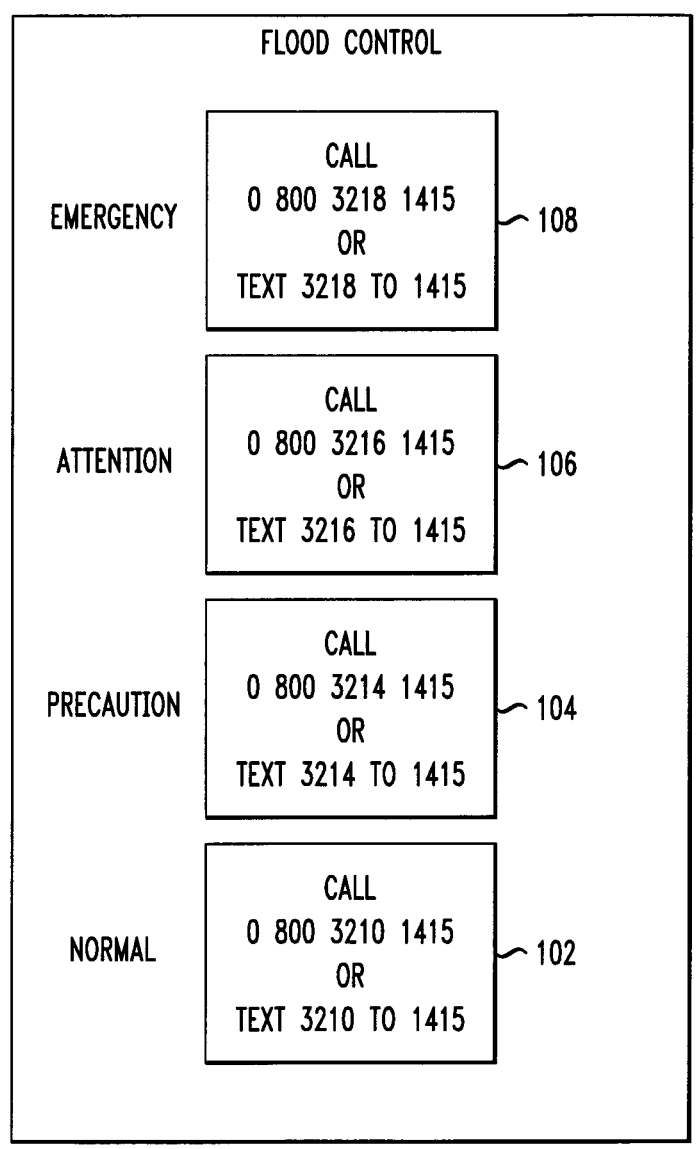
FIG. 1 is a diagram illustrating an example totem display, according to an embodiment of the present invention.

Principles of the invention include techniques for flood data collection and providing a warning mechanism based on flood information totems. One or more embodiments of the invention include using augmented flood information totems to enable local residents to work as sensor data gatherers for a flood monitoring and/or forecasting system and, at the same time, register the residents as people who should receive flood warnings.

As described herein, a flood information totem is a vertical sign, positioned at an area affected by flooding, which displays color bands related to different water levels, and a number or collection of numbers to where a person can call or send a short message service (SMS) message to report information regarding the water level. In one or more embodiments of the invention, no electronics or sensors need to be embedded in the totem. In such instances, the communication is performed by people who are in the area and have a communication device such as, for example, a cell phone.

By way of example, when a person calls or SMSs a call center to report information regarding the water level, he/she reports the area of the totem (for example, a number printed on the totem) and the color band of the current water level. In one or more embodiments of the invention, the process can be further simplified by the use of different numbers or SMS destinations associated to each color band, as to avoid the need of human contact with the caller, thereby automating the process.

Also, when receiving a call from an informant (that is, an individual reporting information), the flood warning system stores the data received and may perform additional actions. For example, the flood warning system can immediately provide the informant with feedback about the forecast flood level of that area (and therefore reward him/her for the information). Further, the flood warning system can also register or automatically subscribe the phone number (of the informant) as an potential person interested in warnings for flood levels in that area. The flood warning system can also, for example, receive subscriptions from other sources such as Internet websites, call centers, etc.

One or more embodiments of the invention can also include adding sensors and communication devices to the flood information totems, such as, for example, sirens, loudspeakers, rain-fall meters, flood level meters, and interactive displays (for example, for registering cell phones). Totems can additionally house, by way of example, communication devices with emergency centers. Additionally, one or more embodiments of the invention can include strategically positioning a network of totems in flooding-affected areas, wherein the totems can also provide contact numbers for people to easily communicate flooding levels in those areas.

As detailed herein, the implementation of a warning system of one or more embodiments of the invention can be based on standard SMS and/or phone bank technologies, connected to manual or automated flood management systems that generate warnings for different geographic areas.

FIG. 1 is a diagram illustrating an example totem display, according to an embodiment of the present invention. By way of illustration, FIG. 1 depicts flooding levels (for example, color-coded flooding levels) 102, 104, 106 and 108, ranging from the lowest water level (102) progressively up to the highest water level (108). The depicted flooding levels enable easy communication of water levels with an Emergency Call Center and/or first responders.

As also depicted in FIG. 1, a totem display can additionally include an area number to be used by citizens if directly contacting an Emergency Call Center (for example, 911), enabling the citizen to be precise about his/her location. Totem displays can also include calling numbers and SMS addresses that enable a citizen to automatically provide information to a Flood Management Center (or call center) about position and flooding levels without the need for human operators. Further, the totem displays can include information about how to register (for example, by phone or Internet) a phone number to receive warnings for the particular area in question.

Figure 2:
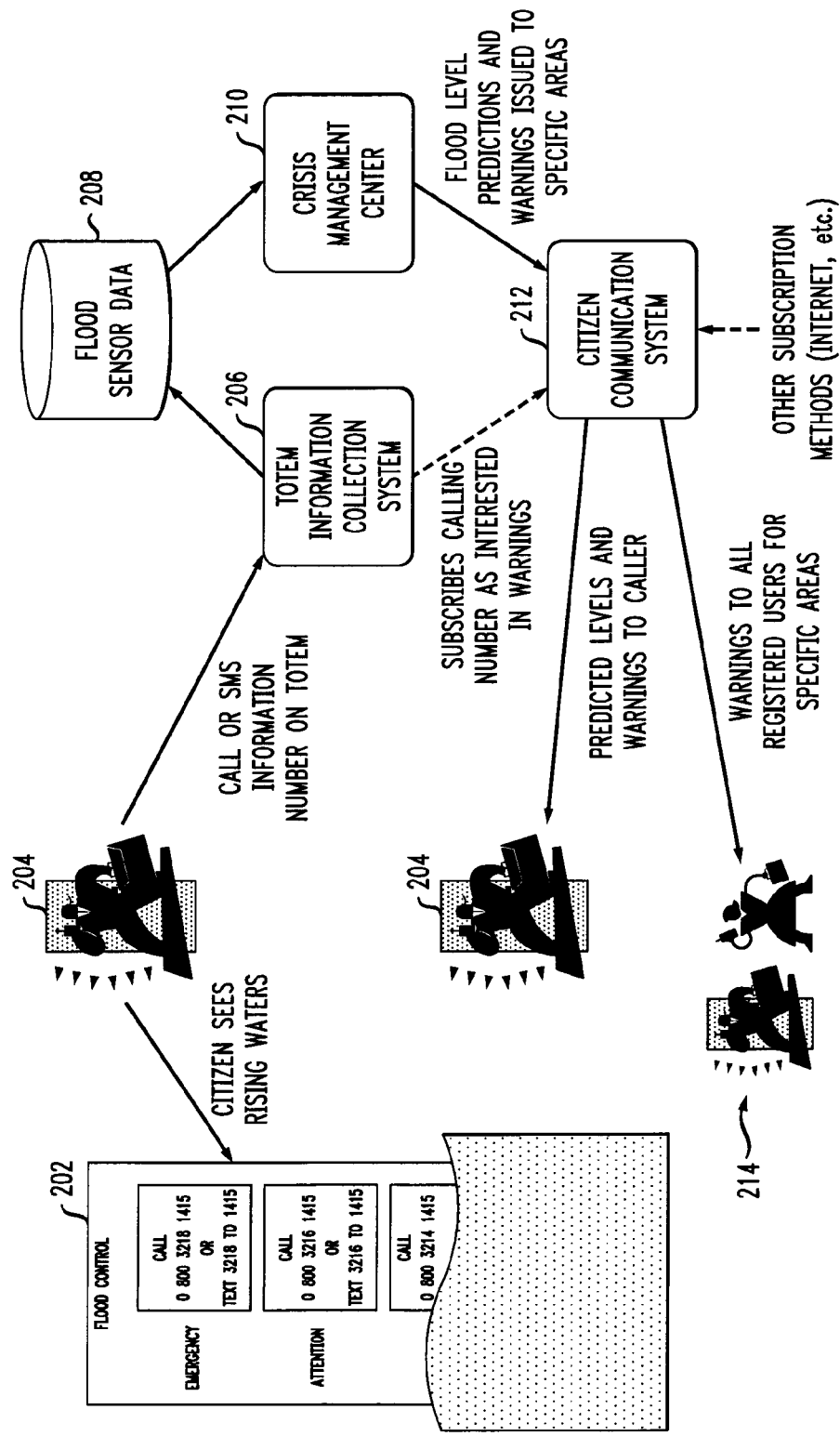
FIG. 2 is a block diagram illustrating an example embodiment, according to an aspect of the invention.

FIG. 2 is a block diagram illustrating an example embodiment, according to an aspect of the invention. By way of illustration, FIG. 2 depicts a totem display 202, an individual/citizen 204, a totem information collection system module 206, a flood sensor data module 208, a crisis management center module 210, a citizen communication system module 212 and additional registered users/subscribers 214.

As detailed in FIG. 2, an individual/citizen 204 observes rising waters in connection with a totem display 202 and calls or sends a SMS message to the number indicated on the totem display to report information regarding the water level to the totem information collection system module 206. The totem information collection system module 206 then provides input to the flood sensor data module 208, which then provides input to the crisis management center module 210. The totem information collection system 206 can be, in one or more embodiments of the invention, a computer system that receives SMS messages, processes the text of the messages, and send the time, the area, and flood level information to the flood sensor data module 208.

Additionally, in one or more embodiments, the totem information collection system 206 can be a call-center manned by agents who receive calls from individuals close to a totem display 202, obtain basic information such as the area number of the totem and the flood level, and send the time, the area, and flood level information to the flood sensor data module 208. One or more embodiments of the invention can also include phone numbers shown in the different bands of the totem display 202 (as exemplified in FIG. 1) indicating the area of the totem display 202 and the water level. Therefore, in such an embodiment, the caller can be answered by an automatic phone bank system (or a live agent) which provides a message with useful information for the caller, and at the same time, automatically sends the time, the area, and flood level information to the flood sensor data module 208.

Further, the crisis management center module 210 provides flood level predictions and warnings issued for specific geographic areas to the citizen communication system module 212, which then forwards the predicted levels and warnings to the caller 204 as well as to all registered users/subscribers 214 for any relevant specific geographic areas.

As also depicted in FIG. 2, the totem information collection system module 206 can forward caller (204) information to the citizen communication system module 212 to subscribe the calling number as interested in receiving future warnings. The citizen communication system module 212 can additionally receive subscription requests from other subscription methods (for example, Internet communications, etc.).

Figure 3:
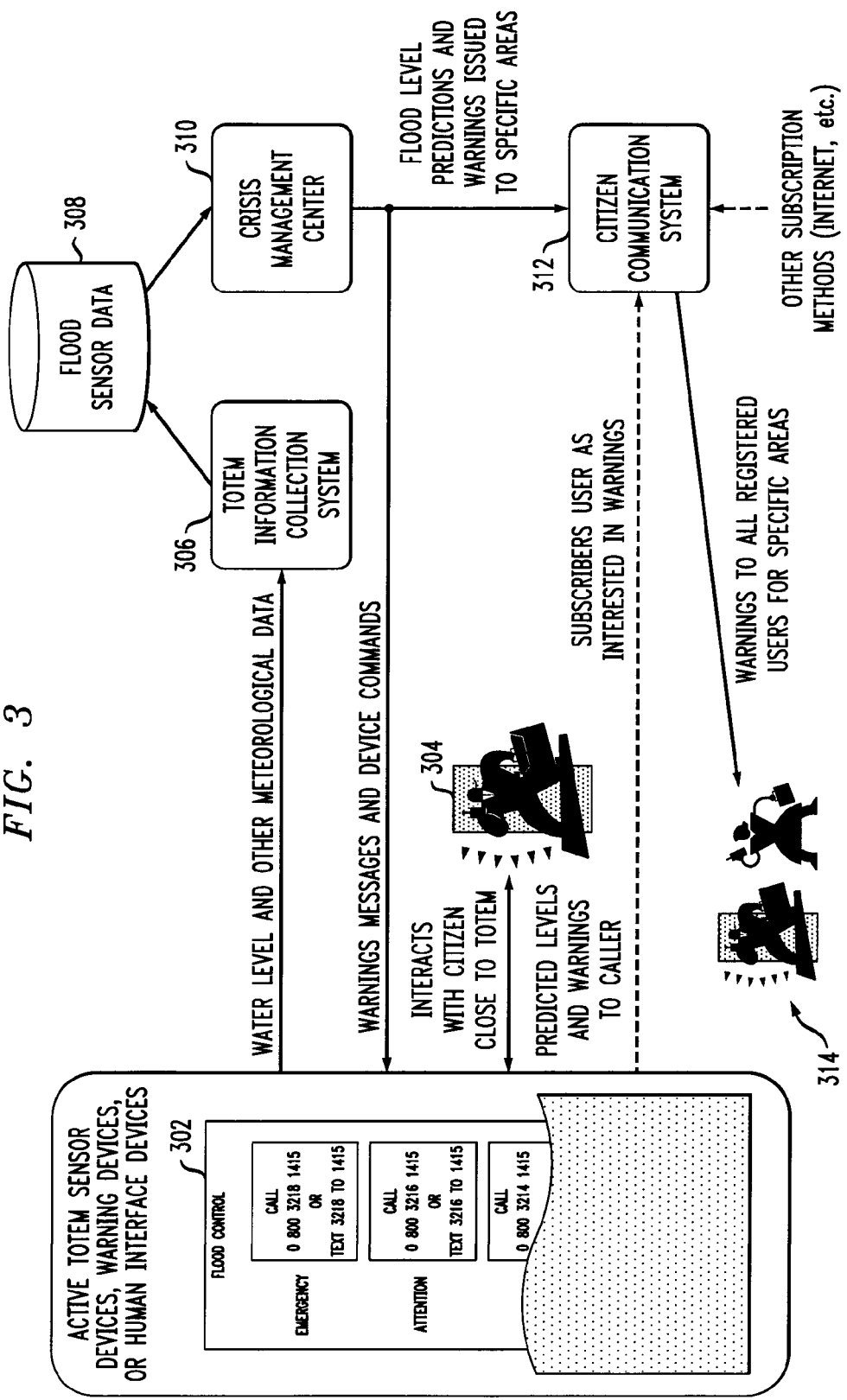
FIG. 3 is a block diagram illustrating an example embodiment, according to an aspect of the invention.

FIG. 3 is a block diagram illustrating an example embodiment, according to an aspect of the invention. By way of illustration, FIG. 3 depicts an active totem display 302, an individual/citizen 304, a totem information collection system module 306, a flood sensor data module 308, a crisis management center module 310, a citizen communication system module 312 and additional registered users/subscribers 314. The active totem display 302 can include, in one or more embodiments of the invention, sensor devices, warning devices, human interface devices, etc.

FIG. 3 illustrates an example embodiment of the invention where the totem display contains sensing devices such as rain-fall meters, flood level meters, or similar. FIG. 3 additionally depicts that in one or more embodiment of the invention, the totem displays can contain warning devices such as sirens or loudspeakers that can be remotely activated, as well as a human interface device such as a telephone, an interactive image display, or similar. It is also to be appreciated that a totem display can embody multiple of device types noted herein, and that any of these devices can communicate through a phone line, radio, or other communication media to other components of the system.

When a totem 302 display embodies sensors, it can use a communication medium to send the information sensed (for example, water level, other meteorological data, etc.) to the totem information collection system 306. The totem information collection system module then provides input to the flood sensor data module 308, which then provides input to the crisis management center module 310. Further, the crisis management center module 310 provides flood level predictions and warnings issued for specific geographic areas to the citizen communication system module 312, which can forward the information to all registered users/subscribers 314 for any relevant specific geographic areas. As also noted herein, the citizen communication system module 312 can additionally receive subscription requests from other subscription methods (for example, Internet communications, etc.).

FIG. 3 also depicts that the totem display 302 may receive messages and commands from the crisis management center 310, such as the triggering of sirens or messages to be announced through the loudspeakers. Further, FIG. 3 illustrates that in an embodiment where the totem display 302 contains human interface devices, it can be used to interact with a person close to the totem 304, providing and gathering information (for example, predicted water levels, warnings, etc.) from the user.

Additionally, in one or more embodiments of the invention, the flood warning and data collection system includes totem displays with and without devices, and the information flow can be a combination of the flows depicted in FIGS. 2 and 3. Further, as described herein, one or more embodiments of the invention can include communication devices with emergency centers.

Figure 4:
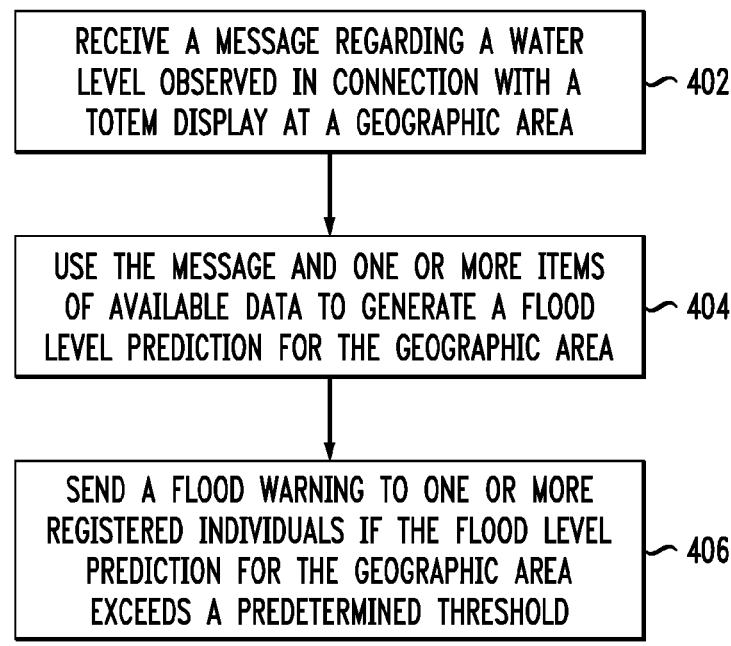
FIG. 4 is a flow diagram illustrating techniques for automatically providing flood warnings to individuals, according to an embodiment of the invention.

FIG. 4 is a flow diagram illustrating techniques for automatically providing flood warnings to individuals, according to an embodiment of the present invention. Step 402 includes receiving a message regarding a water level observed in connection with a totem display at a geographic area. This step can be carried out, for example, using a totem information collection system module. Receiving a message regarding a water level observed in connection with a totem display at a geographic area can include receiving a message via a number indicated on the totem display, wherein the message is a telephone message or a SMS message. Receiving a message regarding a water level observed in connection with a totem display at a geographic area can also include receiving the message from an individual making an observation as per the water level at a totem display at a geographic area.

As described herein, a totem display includes a vertical sign positioned at an area potentially affected by flooding, wherein the sign displays multiple color bands related to multiple water levels. Accordingly, receiving a message regarding a water level observed in connection with a totem display at a geographic area can further include receiving a message identifying the color band coinciding with current water level at the geographic area, as well as using a set of telephone numbers or a set of SMS destinations associated with each color band.

Additionally, in one or more embodiments of the invention, a totem display can also include an area number coinciding with the geographic area, one or more telephone numbers and one or more SMS addresses to enable a user to automatically provide information about geographic area and water level, and/or information about how to register a user phone number to receive future warnings pertaining to a geographic area.

Step 404 includes using the message and one or more items of available data to generate a flood level prediction for the geographic area. Such data can include any data related to possible warning conditions and can include. By way of example, to generate a flood level prediction for the geographic area, the mechanism can consider, in addition to the water level provided by the user, the data provided by other users previously, historical data, meteorological and weather forecast data, the result of weather and flooding models, and manually input, among other similar data sources. This step can be carried out, for example, using a crisis management center module.

Step 406 includes sending a flood warning to one or more registered individuals if the flood level prediction for the geographic area exceeds a predetermined threshold. This step can be carried out, for example, using a citizen communication system module. In one or more embodiments of the invention, the warning can be automatically sent and/or the message(s) can be sent as decided by the crisis management center. Sending a flood warning to registered individuals can include sending the flood level prediction and flood warning to an entity sending the message regarding a water level observed in connection with a totem display at a geographic area. Also, one or more embodiments of the invention include automatically registering the entity sending the message regarding a water level observed in connection with a totem display at a geographic area for future flood warnings.

Further, the techniques depicted in FIG. 4 can include facilitating receipt of subscription requests for flood warnings from one or more additional entities/individuals. Also, one or more embodiments of the invention include storing data received from the message regarding a water level observed in connection with a totem display at a geographic area.

The techniques depicted in FIG. 4 additionally include implementing one or more sensors and/or one or more communication devices to a totem display. Communication devices can include, for example, a siren, a loud-speaker, a rain-fall meter, a flood level meter, and/or an interactive display.

The techniques depicted in FIG. 4 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In one or more embodiments, the modules include a totem information collection system module, a flood sensor data module, a crisis management center module, and a citizen communication system module that can run, for example on one or more hardware processors. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 5:
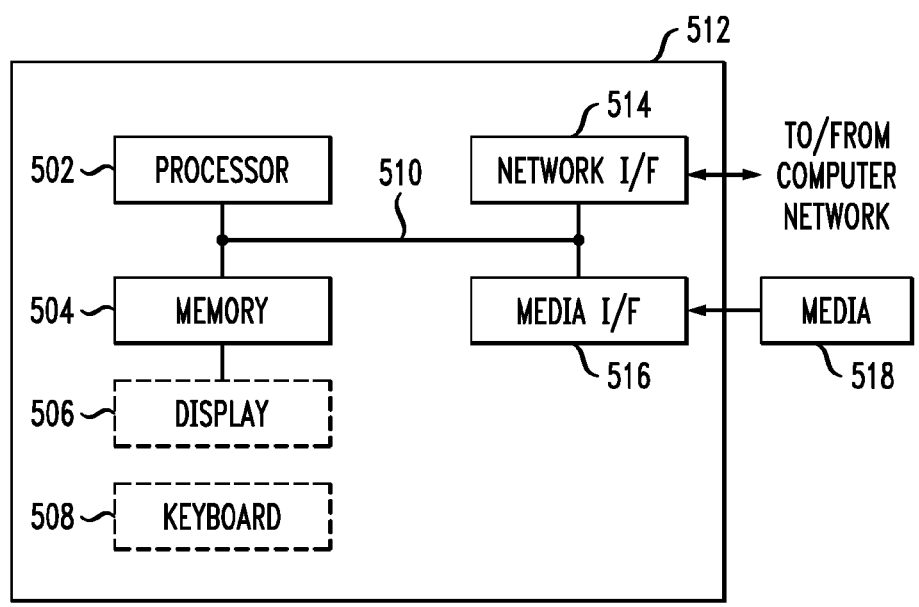
FIG. 5 is a system diagram of an exemplary computer system on which at least one embodiment of the invention can be implemented.

One or more embodiments can make use of software running on a general purpose computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2 and FIG. 3. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, using augmented flood information totems to enable local residents to work as sensor data gatherers for a flood monitoring system while also registering the residents as people who should receive flood warnings.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for automatically providing flood warnings to individuals, wherein the method comprises:
   receiving a message regarding a water level observed in connection with a totem display at a geographic area via a number indicated on the totem display, wherein the message is a telephone message and/or a short message service (SMS) message;
   using the message and one or more items of available data to generate a flood level prediction for the geographic area; and
   sending a flood warning to one or more registered individuals if the flood level prediction for the geographic area exceeds a predetermined threshold.

2. The method of claim 1, wherein receiving a message regarding a water level observed in connection with a totem display at a geographic area comprises receiving the message from an individual making an observation as per the water level at a totem display at a geographic area.

3. The method of claim 1, wherein a totem display comprises a vertical sign positioned at an area potentially affected by flooding, wherein the sign displays multiple color bands related to multiple water levels.

4. The method of claim 3, wherein receiving a message regarding a water level observed in connection with a totem display at a geographic area comprises receiving a message identifying the color band coinciding with current water level at the geographic area.

5. The method of claim 3, wherein receiving a message regarding a water level observed in connection with a totem display at a geographic area comprises using a set of one or more telephone numbers or a set of one or more short message service (SMS) destinations associated with each color band.

6. The method of claim 1, wherein a totem display comprises at least one of an area number coinciding with the geographic area, one or more telephone numbers and one or more short message service (SMS) addresses to enable a user to automatically provide information about geographic area and water level, and information about how to register a user phone number to receive future warnings pertaining to a geographic area.

7. The method of claim 1, wherein sending a flood warning to one or more registered individuals comprises sending the flood level prediction and flood warning to an entity sending the message regarding a water level observed in connection with a totem display at a geographic area.

8. The method of claim 1, further comprising automatically registering an entity sending the message regarding a water level observed in connection with a totem display at a geographic area for future flood warnings.

9. The method of claim 1, further comprising facilitating receipt of subscription requests for flood warnings from one or more additional entities.

10. The method of claim 1, further comprising storing data received from the message regarding a water level observed in connection with a totem display at a geographic area.

11. The method of claim 1, further comprising implementing at least one of one or more sensors and one or more communication devices to a totem display.

12. The method of claim 11, wherein one or more communication devices comprise at least one of a siren, a loud-speaker, a rain-fall meter, a flood level meter, and an interactive display.

13. The method of claim 1, further comprising providing a system, wherein the system comprises one or more distinct software modules, each of the one or more distinct software modules being embodied on a tangible computer-readable recordable storage medium, and wherein the one or more distinct software modules comprise a totem information collection system module, a flood sensor data module, a crisis management center module, and a citizen communication system module executing on a hardware processor.

14. A computer program product comprising a tangible computer readable recordable storage medium including computer useable program code for automatically providing flood warnings to individuals, the computer program product including:
   computer useable program code for receiving a message regarding a water level observed in connection with a totem display at a geographic area via a number indicated on the totem display, wherein the message is a telephone message and/or a short message service (SMS) message;
   computer useable program code for using the message and one or more items of available data to generate a flood level prediction for the geographic area; and
   computer useable program code for sending a flood warning to one or more registered individuals if the flood level prediction for the geographic area exceeds a predetermined threshold.

15. The computer program product of claim 14, wherein a totem display comprises a vertical sign positioned at an area potentially affected by flooding, wherein the sign displays multiple color bands related to multiple water levels.

16. The computer program product of claim 15, wherein the computer useable program code for receiving a message regarding a water level observed in connection with a totem display at a geographic area comprises computer useable program code for receiving a message identifying the color band coinciding with current water level at the geographic area.

17. The computer program product of claim 15, wherein the computer useable program code for receiving a message regarding a water level observed in connection with a totem display at a geographic area comprises computer useable program code for using a set of one or more telephone numbers or a set of one or more short message service (SMS) destinations associated with each color band.

18. The computer program product of claim 14, further comprising computer useable program code for implementing at least one of one or more sensors and one or more communication devices to a totem display.

19. The computer program product of claim 18, wherein one or more communication devices comprise at least one of a siren, a loud-speaker, a rain-fall meter, a flood level meter, and an interactive display.

20. A system for automatically providing flood warnings to individuals, comprising:
   a memory; and
   at least one processor coupled to the memory and operative to:
      receive a message regarding a water level observed in connection with a totem display at a geographic area via a number indicated on the totem display, wherein the message is a telephone message and/or a short message service (SMS) message;
      use the message and one or more items of available data to generate a flood level prediction for the geographic area; and
      send a flood warning to one or more registered individuals if the flood level prediction for the geographic area exceeds a predetermined threshold.

21. The system of claim 20, wherein a totem display comprises a vertical sign positioned at an area potentially affected by flooding, wherein the sign displays multiple color bands related to multiple water levels.

22. The system of claim 21, wherein the at least one processor coupled to the memory operative to receive a message regarding a water level observed in connection with a totem display at a geographic area is further operative to receive a message identifying the color band coinciding with current water level at the geographic area.

23. The system of claim 21, wherein the at least one processor coupled to the memory operative to receive a message regarding a water level observed in connection with a totem display at a geographic area is further operative to use a set of one or more telephone numbers or a set of one or more short message service (SMS) destinations associated with each color band.

24. The system of claim 20, wherein the at least one processor coupled to the memory is further operative to implement at least one of one or more sensors and one or more communication devices to a totem display.

* * * * *